United States Patent [19]
Tsukimoto et al.

[11] Patent Number: 5,436,522
[45] Date of Patent: Jul. 25, 1995

[54] VIBRATION DRIVE ACTUATOR

[75] Inventors: Takayuki Tsukimoto, Kawasaki; Takashi Maeno, Yokohama, both of Japan

[73] Assignee: Canon Kabushiki Kaisha, Tokyo, Japan

[21] Appl. No.: 86,369

[22] Filed: Jul. 6, 1993

Related U.S. Application Data

[63] Continuation of Ser. No. 736,579, Jul. 26, 1991, abandoned.

[30] Foreign Application Priority Data

Aug. 3, 1990 [JP] Japan .................. 2-206236

[51] Int. Cl.⁶ .......................................... H01L 41/08
[52] U.S. Cl. ...................................... 310/323
[58] Field of Search ......................... 310/323, 317

[56] References Cited

U.S. PATENT DOCUMENTS

| | | | |
|---|---|---|---|
| 4,290,074 | 9/1981 | Royer | 310/323 |
| 4,484,099 | 11/1984 | Kawai et al. | 310/317 |
| 4,857,793 | 8/1989 | Okuno | 310/323 |
| 5,099,166 | 3/1992 | Hirano et al. | 310/323 |
| 5,115,161 | 5/1992 | Myohga et al. | 310/323 |
| 5,122,700 | 6/1992 | Tamai et al. | 310/323 |
| 5,124,611 | 6/1992 | Tamai et al. | 310/317 |
| 5,140,215 | 8/1992 | Yamaguchi | 310/323 |

FOREIGN PATENT DOCUMENTS

| | | | |
|---|---|---|---|
| 0289734 | 11/1988 | European Pat. Off. | H01L 41/08 |
| 0406843 | 1/1991 | European Pat. Off. | H01L 41/09 |

*Primary Examiner*—Thomas M. Dougherty
*Attorney, Agent, or Firm*—Fitzpatrick, Cella, Harper & Scinto

[57] ABSTRACT

A vibration driven motor comprises a bar-shaped elastic member and a piezo-electric element for causing a plurality of bending mode vibrations having a predetermined phase difference therebetween in a plurality of planes of the elastic member in order to drive a movable body by a rotary motion caused in particles of the elastic member. A support member which extends along an axial center of the bar-shaped elastic member is provided at one end or each end of the elastic member.

40 Claims, 4 Drawing Sheets

VIBRATION DRIVE ACTUATOR

This application is a continuation of application Ser. No. 07/736,579 file Jul. 26, 1991, now abandoned.

BACKGROUND OF THE INVENTION

1. Field of the Invention

The present invention relates to an ultrasonic motor or a vibration driven motor which bends and vibrates a pencil-type vibrator which holds both sides of an electro-mechanical energy conversion element such as a piezo-electric element thicknesswise by supplying an energy to the electro-mechanical energy conversion element to cause a rotary motion such as a circular or elliptic motion of a mass point so that a movable body pressed to the vibrator is frictionally driven.

2. Related Background Art

In a prior art ultrasonic motor, a travelling bending vibration is caused in a ring-shaped metallic vibrating elastic member to drive a movable body by a frictional force. This type of ultrasonic motor has been used in an auto-focusing mechanism of a camera.

However, in this type of ultrasonic motor, since the vibrating elastic member is of ring shape, a cost of a unit including a pressing mechanism to create a frictional force is high and it is disadvantageous in terms of cost in an application which does not require hollowness (ring shape).

As an ultrasonic motor of a bar type such as pencil type which has a simple pressing mechanism, a motor shown in FIGS. 9 and 10 has been proposed.

In FIGS. 9 and 10, a symbol A denotes a vibrator of a pencil-type ultrasonic motor or a vibration wavemotor. It comprises a pencil type front vibrating elastic member 1, a cylindrical rear vibrating elastic member 2, doughnut-shaped piezo-electric plates 3 and 4 as electro-mechanical energy conversion elements provided between the front vibrating elastic member 1 and the rear vibrating elastic member 2, and electrode plates (not shown) for applying an AC voltage to the piezo-electric plates 3 and 4, provided between the piezo-electric plates 3 and 4. The piezo-electric plates 3 and 4 and the electrode plates are held and secured by bolts 6 between the front vibrating elastic member 1 and the rear vibrating elastic member 2.

The piezo-electric plates 3 and 4 are polarized with different polarities symmetrically about a cross-section which passes through an axis, and the plates 3 and 4 are shifted by 90 degrees along a direction $\theta$.

When AC voltages $V_1$ and $V_2$ having frequencies close to specific bending vibration frequency of the vibrator are applied to the piezo-electric plates 3 and 4, the piezo-electric plates expand or shrink thickness-wise to cause the bending vibration in the vibrator. If the AC voltages $V_1$ and $V_2$ have the same amplitude and frequency and a 90-degree phase shift therebetween, the vibrator A makes a circular motion like a rope in a ropeskipping herein (after called a ropeskipping vibration) around an axial center of the vibrator. In other words, when a plurality of bending mode vibrations having a predetermined phase difference therebetween are caused by the piezo-electric elements 3 and 4 in a plurality of planes of the bar-shaped elastic member, the rotary motion is caused in the particles of the elastic member. By inverting the phases of the AC voltages $V_1$ and $V_2$, the forward and backward rotations of the circular motion are attained.

A symbol R denotes a rotor coaxially fitted to the axial center 1 of the vibrator A. One fitting end thereof is pressed to a sliding area B of the vibrator by a spring force of a spring 5 and it is rotated by frictional drive by the vibration caused by the vibrator A. The spring 5 is resiliently loaded between a tip end of the bolt 6 and a spring post 8 which fits to a thrust bearing 7 having a flange.

As a method for supporting the vibrator A, it has been proposed to provide a flange on a side wall of the vibrator and support the flange by a low friction material. In this method, in order to support the vibrator without restricting the vibration of the vibrator, a fixed area must slip. As a result, an energy loss is created by the friction.

SUMMARY OF THE INVENTION

It is an object of the present invention to provide a vibration driven motor which can support a vibrator without causing a loss of frictional energy to the vibrator so that a motor efficiency is improved.

It is another object of the present invention to provide an actuator which propagates less vibration to a system on which the actuator is mounted.

Other objects of the present invention will be apparent from the following detailed description of the invention.

In accordance with one aspect of the present invention, a vibration driven motor comprises a bar-shaped elastic member and a piezo-electric element for causing a plurality of bending mode vibrations having a predetermined phase difference therebetween in a plurality of planes of the elastic member in order to drive a movable body by a rotary motion caused in particles of the elastic member. A support member which extends along an axial center of the bar-shaped elastic member is provided at one end or each end of the elastic member.

DETAILED DESCRIPTION OF THE PREFERRED EMBODIMENTS

Figure 1:
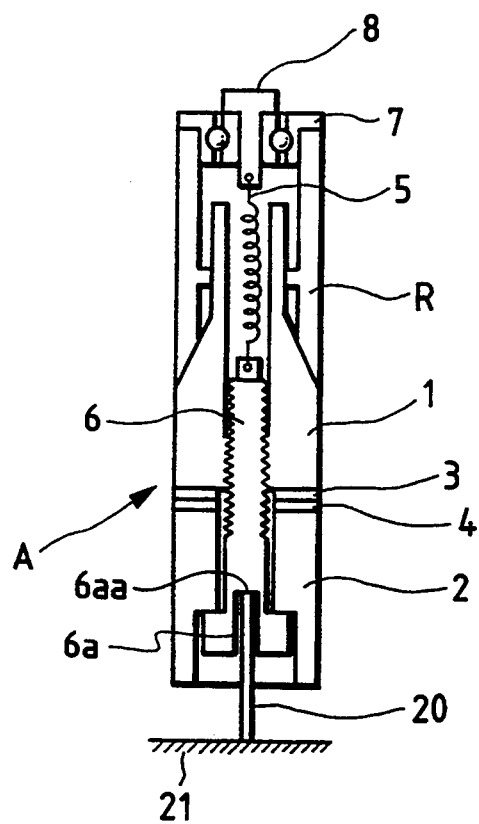
FIG. 1 shows a longitudinal sectional view of one embodiment of a vibration driven motor of the present invention.
Figure 9:
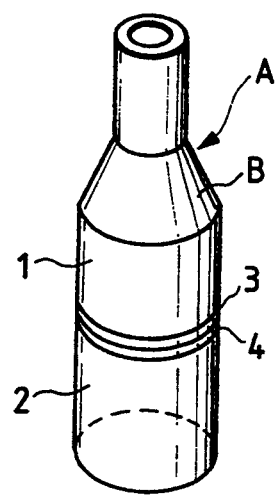
FIGS. 9 and 10 show a perspective view and a longitudinal view of a prior art ultrasonic motor.
Figure 10:
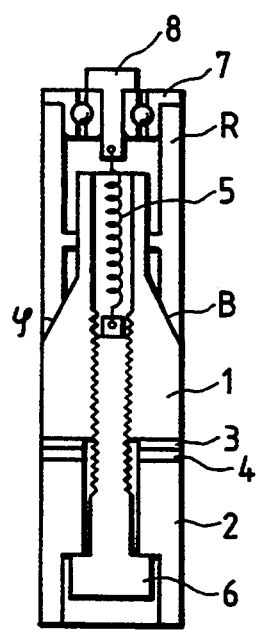

FIG. 1 shows a longitudinal sectional view of one embodiment of a vibration driven motor of the present information. In the following description of the embodiment, like elements to those of the motor shown in FIGS. 9 and 10 are designated by like numerals and the explanation thereof is omitted.

In the present embodiment, one end of a support bar 20 which extends along an axial center of the vibrator A is secured to a bottom of the bolt 6, and the other end is secured to a fixed member 21.

The support bar 20 has the one end thereof secured to a bottom 6aa of an axial hole 6a formed at the bottom of the bolt 6. An outer diameter of the support bar 20 is smaller than an inner diameter of the axial hole 6a so that a gap is formed between the support bar 20 and the axial hole 6a.

The axial hole 6a formed at the bottom of the bolt 6 extends to a position of a node of vibration of a the vibrator A, where the support bar 20 is secured. Because of the gap, the vibrator A and the support bar 20 do not contact each other even if vibration displacements of the vibrator A and the support bar 20 are different.

By the above arrangement, the vibrator A can be secured with a small energy loss.

Namely, since the support bar 20 is secured at the node point of the vibration, that is, at a zero $\gamma$-direction displacement position, a displacement created on the support bar is small and the energy loss in the support bar is small.

Further, since the support bar is inserted into the vibrator, the total length of the motor is reduced.

Figure 2A:
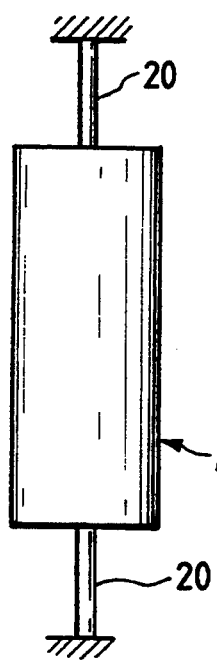
FIGS. 2A and 2B show a side view and a plan view of another embodiment.
Figure 2B:
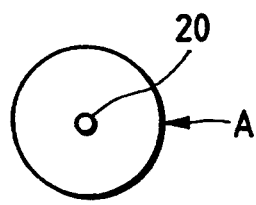

The support bar 20 may be provided on each side of the vibrator A as shown in FIGS. 2A and 2B, instead of only one side of the vibrator A. In this case, since the entire motor assembly is secured, it is easier to take out a motor output from the movable body (rotor). In the one-side support system by the support bar 20, compactness of the overall motor assembly is attained.

Figure 3A:
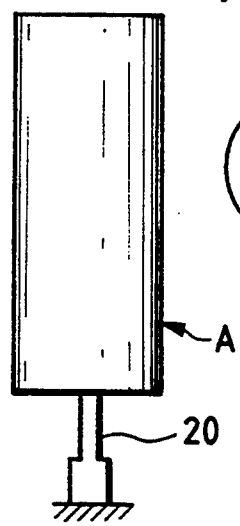
FIGS. 3A and 3B show a side view and a plan view of an embodiment which uses a support bar of a square axis.
Figure 3B:
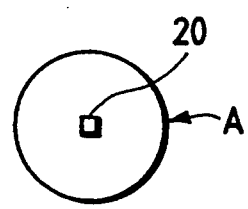

The support bar 20 has a circular cross-section or a square cross-section as shown in FIGS. 2B and 3B.

In the present embodiment, since two standing waves of the same bending mode having a 90-degree circumferential shift therebetween are used as the driving vibration, it is necessary to prevent the specific vibration frequencies of the standing waves from being shifted by the loss of axial symmetry of the vibration system including the support bar 20. For this reason, the circular or square cross-section of the support bar 20 is used.

If the specific vibration frequencies are different from each other, the amplitudes of the standing waves generated when the same input voltage is applied are different, and a point on a surface of the vibrator does not trace a real circular track and a contact to the movable member is non-uniform in time. As a result, unnecessary slip loss is caused.

By arranging the support bar 20 substantially coaxially to the vibrator A and using the support bar having a circular cross-section or a regular n-side polygon cross-section (where n is an integer), the specific vibration frequencies of the same bending mode having the 90-degree circumferential shift are equal.

In embodying the present invention, the method for securing the support bar is an important factor. One solution therefor is shown in FIGS. 4A and 4B.

Figure 4A:
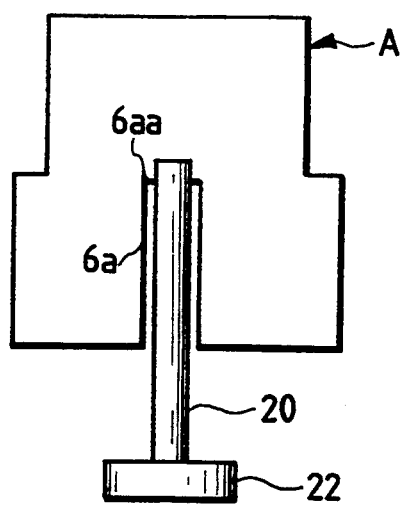
FIGS. 4A and 4B show an embodiment which uses an additional mass, and a vibration mode thereof.
Figure 4B:
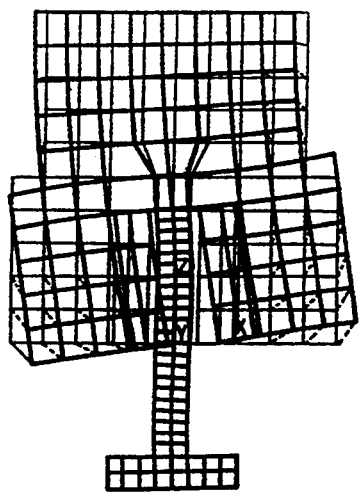

As shown in FIG. 4A, an additional mass 22 is attached to an end of the support bar 20. FIG. 4B shows a vibration mode of the vibration system including the support bar 20 and the additional mass 22 when they are driven. The additional mass 22 is not secured at all.

By attaching the small additional mass 22, the end of the support bar and the additional mass 22 are substantially made static.

Accordingly, by attaching the additional mass 22, externally propogated vibration is very small. This is effective in mounting the motor on a product which does not accept the vibration.

Figure 5:
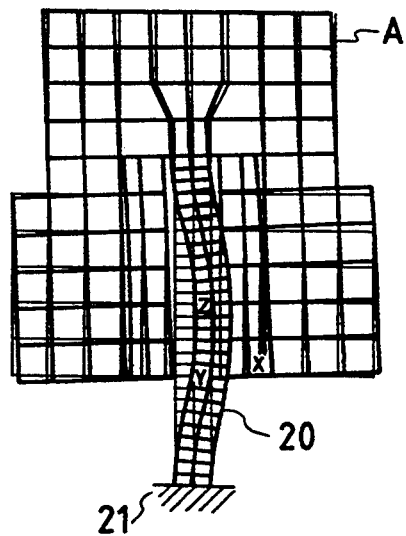
FIGS. 5 and 6 show vibration modes of an embodiment which does not use an additional mass.
Figure 6:
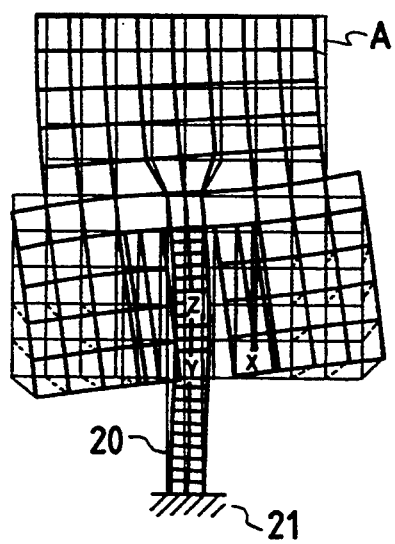

FIGS. 5 and 6 show vibration modes of the vibration system including the support bar 20 when the end of the support bar is secured, without the additional mass 22. A difference between FIGS. 5 and 6 resides in the length of the support bar 20. The support bar of FIG. 5 is longer than that of FIG. 6.

In FIG. 5, the support bar 20 greatly vibrates and the loss in the support bar increases. A big stress is applied to the fixed portion 21 and the vibration energy which leaks to the exterior of the motor from the fixed portion 21 is large.

Thus, when the additional mass 22 is not attached to the motor, the movement of the support bar as shown in FIG. 6 is desirable.

It is determined by a relationship between the natural vibration frequency of the support bar 20 and the driving vibration frequency of the vibrator A. The natural vibration frequency under a predetermined boundary condition of the Support bar 20 (one-end support and one-end secure in FIGS. 5 and 6) should be different from the natural vibration frequency of the vibrator A.

Figure 7:
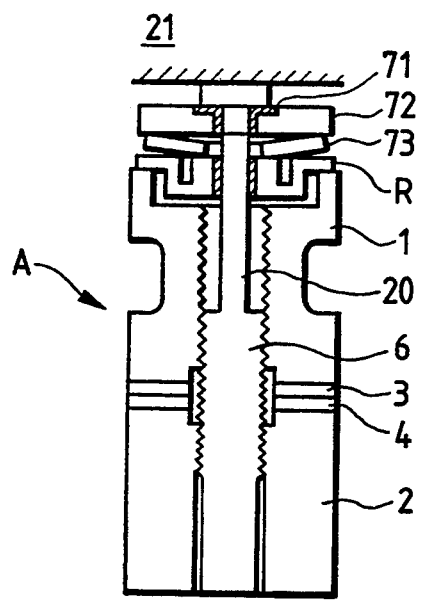
FIGS. 7, 8 and 11 show a pressing mechanism in an embodiment having a support bar on a rotor side.
Figure 8:
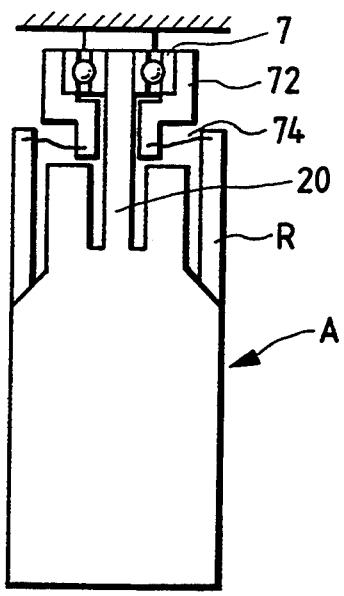

A pressing mechanism when the support bar 20 is coaxially arranged to the vibrator A is shown in FIGS. 7 and 8.

In the embodiment shown in FIG. 7, a rotor R and a pressing member 72 are provided around the support bar 20 through a bearing member 71, and a dish spring 73 is resiliently loaded between the rotor R and the pressing member 72.

In the embodiment shown in FIG. 8, the support bar 20 is formed integrally with the vibrator A, the support bar 20 and the pressing member 72 are connected through a bearing 7, and the pressing member 72 and the rotor R are connected through a leaf spring 74.

Figure 11:
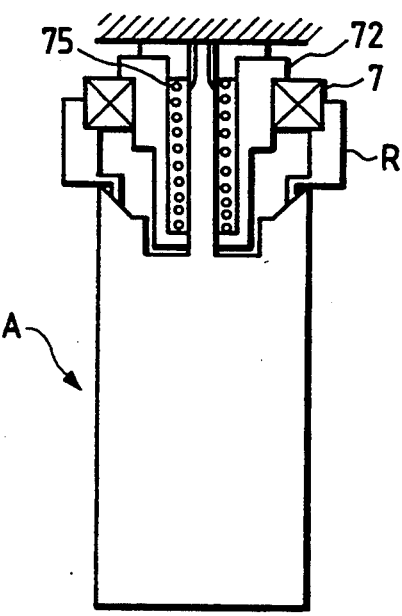

In an embodiment shown in FIG. 11, the pressing member 72 and the rotor R are connected through the bearing 7 and are pressed to the vibrator A by a compressed coil spring 75.

The bottom of the pressing member 72 slides on the support bar 20 for the $\gamma$-direction positioning. Since the coupling point of the support bar 20 and the vibrator A is near the node point of the vibration as described above, the $\gamma$-direction displacement is small and the slide loss is small.

In FIGS. 8 and 11, the piezo-electric elements 3 and 4 are omitted.

Figure 12:
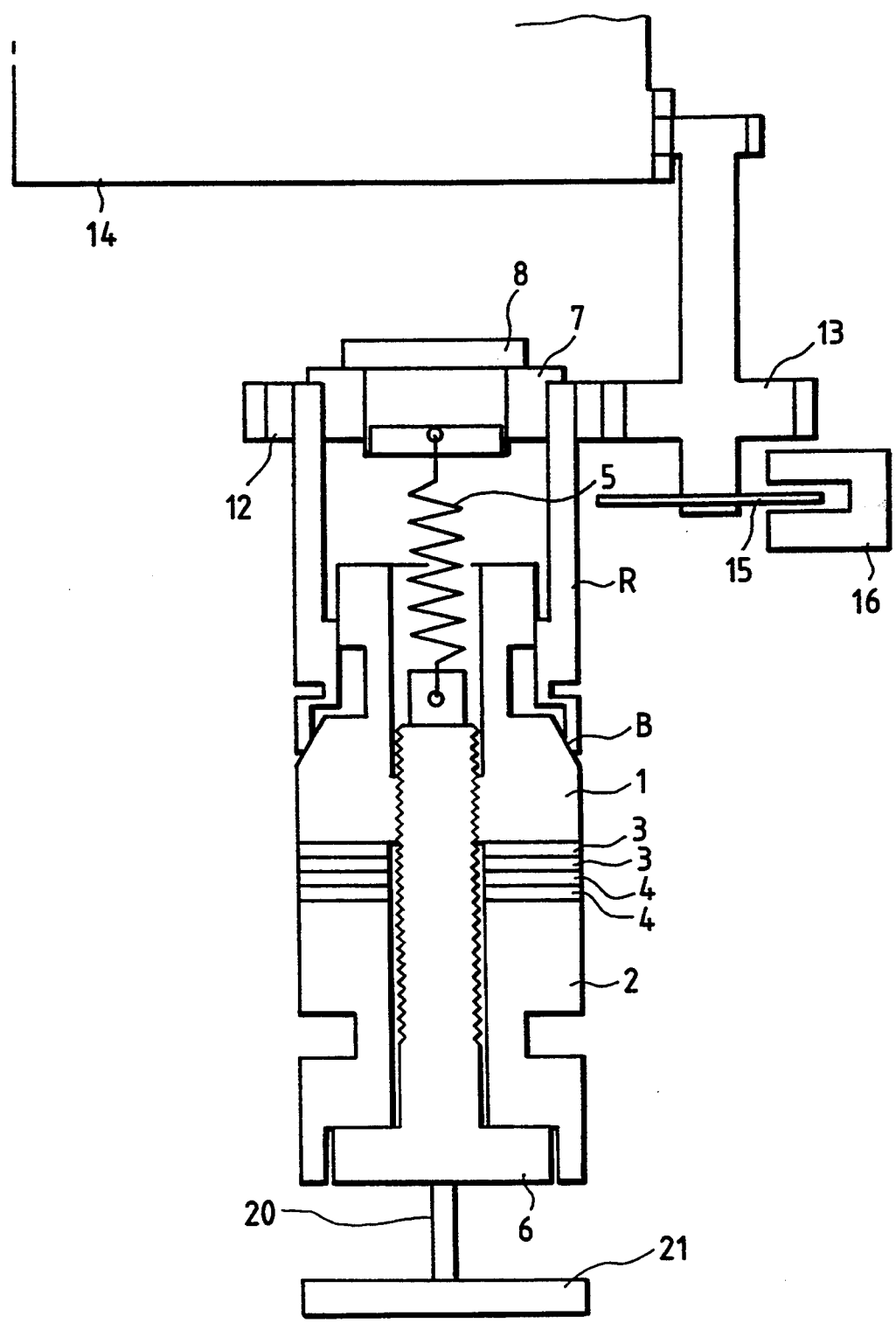
FIG. 12 shows a sectional view of an apparatus which uses a vibration driven motor.

FIG. 12 shows a construction for driving a body tube of an optical lens by using the motor of the present invention.

Numeral 12 denotes a gear which is coaxially joined to the movable body R to transmit a rotation output to a gear 13 so that a body tube 14 having a gear meshed with the gear 13 is rotated.

An optical encoder slit plate 15 is coaxially arranged to the gear 13 in order to detect the rotation positions and the rotation speeds of the movable body R and the body tube 14, which are detected by a photo-coupler 16.

In accordance with the present invention, since the support member follows the vibration displacement of the vibrator, no friction loss is created and the motor efficiency is improved accordingly.

Further, when the additional mass is provided in the support member, the external propagation of vibration is minimized.

What is claimed is:

1. An actuator for a vibration driven motor including a rotor having a center of rotation, said actuator comprising:
   a vibration member for driving said rotor, said vibration member being in contact with said rotor and extending along a predetermined direction;
   an electro-mechanical energy conversion element provided in said vibrator member and arranged to cause a plurality of vibrations having a predetermined phase difference in time therebetween in a plurality of different planes of said vibration member in response to an applied electrical signal, whereby a combined vibration is generated in said vibration member; and
   a supporting members, fixed to a base member and engaging said vibration member, for supporting said vibration member at a predetermined position relative to said base member, at least said rotor and said supporting member being coaxial.

2. An actuator according to claim 1, wherein a section of said supporting member is of a regular n-side polygon, where n is an integer.

3. An actuator according to claim 1, wherein said supporting member and said vibration member have a different natural frequency.

4. An actuator according to claim 1, wherein one end of said supporting member is secured to said vibration member and the other end is engaged with an additional mass.

5. An actuator according to claim 1, wherein said plurality of vibrations are bending mode vibrations.

6. An actuator according to claim 5, wherein said vibration member is bar-shaped.

7. An actuator according to claim 5, wherein said supporting member includes a first support element provided at an upper end of said vibration member and a second support element provided at a lower end of said vibration member.

8. An actuator according to claim 1, wherein one end portion of said supporting member is positioned at a bottom portion of a recess portion of said vibration member.

9. An actuator according to claim 8, wherein a diameter of said supporting member is less than an inner diameter of said recess portion.

10. An actuator according to claim 1, wherein said supporting member is secured to said vibration member at a portion that corresponds to a node of a vibration generated in said vibration member.

11. An actuator according to claim 1, wherein said support member and said vibration member are integral.

12. A vibration driven motor comprising:
    a bar-shaped elastic member extending along a predetermined direction;
    a contact member having a center of rotation and contacted to said elastic member;
    an electro-mechanical energy conversion element provided in said elastic member and arranged for causing a plurality of vibrations having a predetermined phase difference in time therebetween in a plurality of different planes of said elastic member in response to an applied electrical signal, thereby to cause a relative movement between said elastic member and said contact member; and
    a supporting member, fixed to a base member and engaging said vibration member, for holding said vibration member at a predetermined position relative to said base member, wherein at least said vibration member, said contact member and said supporting member are coaxial.

13. A vibration driven motor according to claim 12, wherein said plurality of vibrations are bending mode vibrations.

14. An actuator for a vibration driven motor including a contact member having a center of rotation, said actuator comprising:
    a vibration member for driving said contact member, said vibration member being in contact with said contact member, extending along a predetermined direction, and being arranged for causing a plurality of vibrations having a predetermined phase difference in time therebetween in a plurality of planes thereof in response to an applied electrical signal; and
    a supporting member, fixed to a base member and engaging said vibration member, for holding said vibration member at a predetermined position relative to said base member, wherein at least said vibration member, said contact member and said supporting member are coaxial.

15. An actuator according to Claim 14, wherein said plurality of vibrations are bending mode vibrations.

16. An actuator according to claim 15, wherein said support member and said vibration member are integral.

17. A vibration driven system comprising:
    a vibration member arranged for generating a vibration therein in response to an applied electrical signal;
    a contact member having a center of rotation and contacting said vibration member, and arranged to be driven by a vibration generated in said vibration member;
    a support member, fixed to a base member and secured to one end of said vibration member, for supporting said vibration member relative to said base member, wherein at least said vibration member, said contact member and said supporting member are coaxial; and
    a movable member arranged to be driven by said contact member.

18. An actuator for a vibration driven motor including a rotor having a center of rotation, said actuator comprising:
    a vibration member for driving said rotor, said vibration member being in contact with said rotor and extending along a predetermined direction;
    driving means for generating a plurality of vibrations having a predetermined phase difference in time therebetween in a plurality of different planes of said vibration member in response to an applied electrical signal, whereby a combined vibration is generated in said vibration member; and
    a supporting member, fixed to a base member and engaging said vibration member, for supporting said vibration member at a predetermined position relative to said base member, at least said vibration member and said supporting member being substantially coaxial.

19. An actuator according to claim 18, wherein said supporting member comprises two end portions, one of which is engaged to said vibration member and the other of which is engaged to a fixed member.

20. An actuator for a vibration driven motor having a rotor, said actuator comprising:

a vibration member for driving said rotor, said vibration member being in contact with said rotor and extending along a predetermined direction;

driving means for generating a plurality of vibrations having a predetermined phase difference in time therebetween in a plurality of different planes of said vibration member in response to an applied electrical signal, whereby a combined vibration is generated in said vibration member; and a supporting member, fixed to a base member and engaging said vibration member, for supporting said vibration member at a predetermined position relative to said base member, at least said vibration member and said supporting member extending substantially along the predetermined direction.

21. An actuator according to claim 20, wherein said supporting member comprises two end portions, one of which is engaged to said vibration member, and the other of which is engaged to a fixed member.

22. A vibration driven motor comprising:
a bar-shaped elastic member extending along a predetermined direction;
a contact member having a center of rotation and contacted to said elastic member;
driving means for generating a plurality of vibrations having a predetermined phase difference in time therebetween in a plurality of different planes of said elastic member in response to an applied electrical signal, thereby to cause a relative movement between said elastic member and said contact member; and
a supporting member, fixed to a base member and engaging said elastic member, for holding said elastic member at a predetermined position relative to said base member, wherein at least said elastic member, said contact member and said supporting member are substantially coaxial.

23. An actuator according to claim 22, wherein said supporting member comprises two end portions, one of which is engaged to said elastic member, and the other of which is engaged to a fixed member.

24. A vibration driven motor comprising:
a bar-shaped elastic member extending along a predetermined direction;
a contact member contacted to said elastic member;
driving means for generating a plurality of vibrations having a predetermined phase difference in time therebetween in a plurality of different planes of said elastic member in response to an applied electrical signal, thereby to cause a relative movement between said elastic member and said contact member; and
a supporting member, fixed to a base member and engaging said elastic member, for holding said elastic member at a predetermined position relative to said base member, wherein at least said elastic member, said contact member and said supporting member extend substantially along the predetermined direction.

25. An actuator according to Claim 24, wherein said supporting member comprises two end portions, one of which is engaged to said elastic member and the other of which is engaged to a fixed member.

26. An actuator for a vibration driven motor including a contact member having a center of rotation, said actuator comprising:
a vibration member for driving said contact member, said vibration member being in contact with said contact member, extending along a predetermined direction, and being arranged for causing a plurality of vibrations having a predetermined phase difference in time therebetween in a plurality of planes thereof in response to an applied electrical signal; and
a supporting member, fixed to a base member and engaging said vibration member, for supporting said vibration member at a predetermined position relative to said base member, wherein at least said vibration member, said contact member and said supporting member are substantially coaxial.

27. An actuator for a vibration driven motor having a contact member, said actuator comprising:
a vibration member for driving said contact member, said vibration member being in contact with said contact member, extending along a predetermined direction, and being arranged for causing a plurality of vibrations having a predetermined phase difference in time therebetween in a plurality of planes thereof in response to an applied electrical signal; and
a supporting member, fixed to a base member and engaging said vibration member, for supporting said vibration member at a predetermined position relative to said base member, wherein at least said vibration member, said contact member and said supporting member extend substantially along the predetermined direction.

28. A vibration driven system comprising:
a vibration member for generating a vibration therein in response to an applied signal,
a contact member having a center of rotation and contacting said vibration member and arranged to be driven by a vibration generated in said vibration member;
a supporting member fixed to a base member and secured to one end of said vibration member, for supporting said vibration member relative to said base member, wherein at least said vibration member, said contact member and said supporting member are substantially coaxial; and
a movable member arranged to be driven by said contact member.

29. An actuator for a vibration driven motor with a contact member or a system having the actuator, comprising:
a vibration member for driving said contact member, said vibration member being in contact with said contact member, extending along a predetermined direction, and being arranged for causing a plurality of vibrations having a predetermined phase difference in time therebetween in a plurality of planes thereof in response to an applied electrical signal; and
a supporting member, fixed to a base member and engaging said vibration member, for supporting said vibration member at a predetermined position relative to said base member, wherein at least said vibration member and said supporting member extend substantially along the predetermined direction.

30. An actuator or a system according to claim 29, wherein said vibration member includes a first vibration element, a second vibration element, and a piezoelectric element disposed between said first and second vibration elements and responsive to the applied electrical signal.

31. An actuator or a system according to claim 30, wherein said supporting member includes a bolt for press-contacting said vibration elements.

32. An actuator or a system according to claim 31, wherein one end portion of said bolt is fixed at a predetermined position.

33. An actuator or a system according to claim 31, wherein said bolt and said contact member are engaged through a bearing.

34. An actuator or a system according to claim 33, wherein said contact member contacts a top surface of said first vibration element and is driven by said vibration.

35. An actuator or a system according to claim 29, wherein a section of said supporting member is of a regular n-sided polygon, where n is an integer.

36. An actuator or a system according to claim 29, wherein a natural frequency of said supporting member and a natural frequency of said vibration member are independent of each other.

37. An actuator or a system according to claim 29, wherein one end portion of said supporting member is secured to said vibration member and the other end portion is engaged with an additional mass.

38. An actuator or a system according to claim 29, wherein said plurality of vibrations are bending mode vibrations.

39. An actuator or a system according to claim 38, wherein the vibration member has a bar shape.

40. An actuator or a system according to claim 38, wherein said supporting member includes a first support element secured at an upper end of said vibration member and a second support element secured at a lower end.

* * * * *

UNITED STATES PATENT AND TRADEMARK OFFICE
CERTIFICATE OF CORRECTION

PATENT NO. : 5,436,522
DATED : July 25, 1995
INVENTOR(S) : Tsukimoto, et. al.

It is certified that error appears in the above-indentified patent and that said Letters Patent is hereby corrected as shown below:

Title page, col. 1, line 1 and item

[54] TITLE

"VIBRATION DRIVE ACTUATOR" should read --VIBRATION DRIVEN ACTUATOR--.

Column 1

Line 2, "DRIVE" should read --DRIVEN--; and
Line 59, "herein (after" should read --(hereinafter--.

Column 3

Line 6, "6aso" should read --6a so--.

Column 4

Line 17, "It" should read --The movement--; and
Line 21, "Support" should read --support--.

Signed and Sealed this

Twenty-first Day of November, 1995

Attest:

BRUCE LEHMAN

Attesting Officer

Commissioner of Patents and Trademarks